United States Patent
Hatta et al.

(10) Patent No.: US 8,607,230 B2
(45) Date of Patent: Dec. 10, 2013

(54) VIRTUAL COMPUTER SYSTEM AND MIGRATION METHOD OF VIRTUAL COMPUTER

(75) Inventors: Yukari Hatta, Hadano (JP); Eiichiro Oiwa, Tone (JP)

(73) Assignee: Hitachi, Ltd., Tokyo (JP)

( * ) Notice: Subject to any disclaimer, the term of this patent is extended or adjusted under 35 U.S.C. 154(b) by 186 days.

(21) Appl. No.: 13/243,848

(22) Filed: Sep. 23, 2011

(65) Prior Publication Data

US 2012/0131576 A1  May 24, 2012

(30) Foreign Application Priority Data

Nov. 19, 2010  (JP) .................................. 2010-258482

(51) Int. Cl.
*G06F 9/455* (2006.01)
(52) U.S. Cl.
USPC ............................................................. 718/1
(58) Field of Classification Search
None
See application file for complete search history.

(56) References Cited

U.S. PATENT DOCUMENTS

| 7,783,788 | B1 | 8/2010 | Quinn et al. |
| 2010/0031258 | A1 | 2/2010 | Takano et al. |

FOREIGN PATENT DOCUMENTS

| EP | 1 998 255 A1 | 12/2008 |
| EP | 2 151 756 A2 | 2/2010 |
| JP | 2010-33404 | 2/2010 |

OTHER PUBLICATIONS

European Patent Office extended search report on application 11181929.8 dated May 2, 2013; 5 pages.

*Primary Examiner* — Gregory A Kessler
(74) *Attorney, Agent, or Firm* — Foley & Lardner LLP

(57) ABSTRACT

When LPAR in a physical computer is migrated to LPAR in another in the state that OS operates, OS in LPAR can access disk which the OS has accessed before migration just after migration. FC-HBAs connected to the physical computers of the source and destination are constructed redundantly and one FC port is set to logging-out state in migration source before resumption of OS on the way of migration. After logging-in processing of FC is performed beforehand in migration destination by means of WWN of FC logged out in migration source, processing is performed so that path between FC logged and disk is viewed as being on-line from only OS. Path between FC not logged at destination and disk is processed to be viewed as being off-line from OS just after OS operates at destination, so that OS at destination can access the disk.

11 Claims, 11 Drawing Sheets

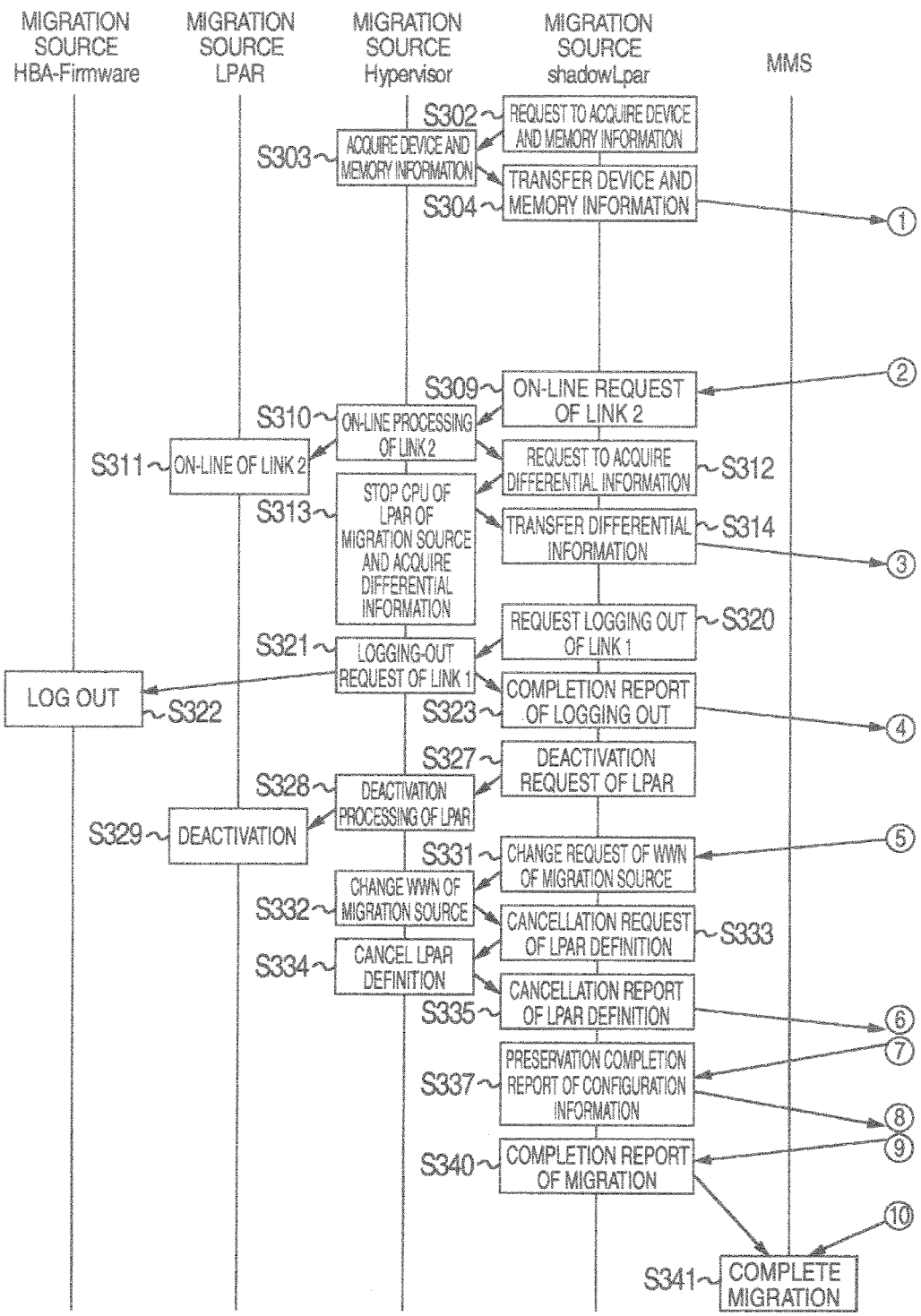

FIG. 4

| | MIGRATION SOURCE | | | | MIGRATION DESTINATION | | | |
|---|---|---|---|---|---|---|---|---|
| | HBA116 | | HBA117 | | HBA216 | | HBA217 | |
| TIME | PHYSICAL | IN MULTIPATH CONTROLLER | PHYSICAL | IN MULTIPATH CONTROLLER | PHYSICAL | IN MULTIPATH CONTROLLER | PHYSICAL | IN MULTIPATH CONTROLLER |
| T0 | O | O | O | O | X | X | X | X |
| T1 | O | O | X | X | X | X | X | X |
| T2 | O | O | X | X | X | X | O | X |
| T3 | O | O | X | O | X | X | O | X |
| T4 | O | X | X | O | X | X | O | O |
| T5 | O | X | X | X | X | X | O | O |
| T6 | X | X | X | X | O | X | O | O |
| T7 | X | X | X | X | O | X | O | O |
| T8 | X | X | X | X | O | O | O | O |

O : Online
X : Logout(Offline)

FIG. 7

| Bits Bytes | 31 | 24 | 23 | 16 | 15 | 08 | 07 | 00 |
|---|---|---|---|---|---|---|---|---|
| 0×0 | PORT ADDRESS OF FIBRE CHANNEL OF TRANSMISSION DESTINATION ||||||||
| ~ | LU NUMBER ||||||||
| ~ | COMMAND TO Disk ||||||||
| | DATA TRANSFER ADDRESS ||||||||
| | DATA LENGTH ||||||||
| 0×FC | TRANSFER DIRECTION (Write/Read) OF DATA AND SO ON ||||||||

FIG. 8

| Bits Bytes | 31 | 24 | 23 | 16 | 15 | 08 | 07 | 00 |
|---|---|---|---|---|---|---|---|---|
| 0×0 | STATE INFORMATION ||||||||
| ~ | ERROR INFORMATION ||||||||
| ~ | ERROR CODE AND SO ON ||||||||
| 0×FC | ||||||||

FIG. 10

| Bits<br>Bytes | 31 | 24 | 23 | 16 | 15 | 08 | 07 | 00 |
|---|---|---|---|---|---|---|---|---|
| 0×0 | COMMAND | | | | | | | |
| 0×4 | INFORMATION INHERENT IN COMMANDS (SUBCOMMANDS) | | SUBCOMMAND | | | | | |
| 0×8 | | | | | | | | |
| ~ | | | | | | | | |
| 0×1FC | | | | | | | | |

FIG. 11

| Bits<br>Bytes | 31 | 24 | 23 | 16 | 15 | 08 | 07 | 00 |
|---|---|---|---|---|---|---|---|---|
| 0×0 | ERROR INFORMATION | | ERROR NUMBER | | NUMBER OF RETRY REQUESTS | | | |
| 0×4 | COMMAND | | SUBCOMMAND | | | | | |
| ~ | INFORMATION INHERENT IN COMMANDS (SUBCOMMANDS) | | | | | | | |
| 0×1FC | | | | | | | | |

VIRTUAL COMPUTER SYSTEM AND MIGRATION METHOD OF VIRTUAL COMPUTER

INCORPORATION BY REFERENCE

The present application claims priority from Japanese application JP2010-258482 filed on Nov. 19, 2010, the content of which is hereby incorporated by reference into this application.

BACKGROUND OF THE INVENTION

The present invention relates to a method of migrating a logical partition being operated in a physical computer to a logical partition in another physical computer and its virtual computer system.

A virtual computer system in which a plurality of logical computers or logical partitions (hereinafter abbreviated as LPAR) are constructed in a single physical computer and a plurality of inherent operating systems (OSs) can be operated in the plurality of logical computers is put to practical use. Furthermore, recently, there is also an example in which a virtual computer system in which logical FC (fibre channel) expansion boards or FC ports are provided in respective logical computers is used in SAN (storage area network) environment containing RAID device.

In the computer system which realizes boot in SAN environment, in order to protect data of logical unit in RAID device in which OS is installed, security function capable of being accessed only from respective computers is effective by the RAID device. As the security function, generally, there is used a method in which inherent IDs (world wide names) assigned to FC ports provided in computers are utilized to relate logical units in which OSs are installed to inherent IDs assigned to FC ports provided in computers so that only access from FC port having the ID is permitted. Further, there is also a case where ID inherent in device is recorded in software containing OS.

In the computer system which performs boot from SAN, inherent IDs assigned to FC ports provided in current computer and waiting computer are different and accordingly when the current computer is changed to the waiting computer, software image containing OS cannot be utilized as it is and it is necessary to change security function set on the side of RAID device by means of SAN management software or manually. This is the same not only for physical computers of current computer and waiting computer but also among LPARs.

JP-A-2010-33404 discloses the technique that configuration information is moved from LPAR in a physical computer to LPAR in another physical computer to take over operation in the virtual computer system in which LPARs can be constructed in a plurality of physical computers.

SUMMARY OF THE INVENTION

In the technique disclosed in JP-A-2010-33404, LPAR before migration is stopped once and is then migrated to another physical computer. In FC, before data transfer is started, information having related port is exchanged. This information exchange is performed upon logging-in, the logging-in time is taken. When LPAR is stopped before migration as the technique disclosed in JP-A-2010-33404, logging-in processing is performed by OS driver upon start of OS and accordingly disk access by OS is not made until the logging-in processing is completed.

However, when operation is taken over to migration destination in the state that LPAR before migration is operated, operation is taken over in the operating state without starting OS of migration destination. Accordingly, OS judges that logging-in processing is completed and makes disk access, although the logging-in processing is not performed actually and accordingly there arises a problem that disk access cannot be made after migration.

Accordingly, in view of the above problem, it is an object of the present invention to provide a virtual computer system and a migration method of a virtual computer capable of accessing the same disk as that before migration just after OS of logical partition is operated in migration destination.

In order to solve the above problem, according to the virtual computer system and the migration method of virtual computer of the present invention, the virtual computer system including a memory device having a logical unit, a plurality of physical computers and a plurality of LPARs which are operated in the physical computers by control of hypervisors comprises a first physical computer (migration source) including a first LPAR and a first shadow LPAR which are operated by control of a first hypervisor and a second physical computer (migration destination) including a second LPAR and a second shadow LPAR which are operated by control of a second hypervisor.

When the first LPAR including a first path controller is migrated to the second physical computer to be operated as second LPAR including a second path controller in the second physical computer, the following operation is performed.

The first shadow LPAR transfers a first WWN assigned to a first logical HBA provided in the first LPAR as an identifier and a second WWN assigned to a second logical HBA provided in the first LPAR as an identifier to the second shadow LPAR. Then, the second hypervisor changes a third WWN assigned to a third logical HBA provided in the second LPAR as an identifier and a fourth WWN assigned to a fourth logical HBA provided in the second LPAR as an identifier into the first and second WWNs transferred, respectively. Next, the first hypervisor logs out connection between the second logical HBA and the logical unit to make connection state between the second logical HBA and the logical unit off-line. The second hypervisor logs in connection between the fourth logical HBA having the second WWN and the logical unit. The first shadow LPAR transfers logical resource information of the first LPAR to the second shadow LPAR. The second hypervisor makes the transferred logical resource information of the first LPAR reflected on the second LPAR. The first hypervisor receives completion notification of connection between the fourth logical HBA having the second WWN and the logical unit to make connection state between the second logical HBA to which the second WWN is transferred and the logical unit on-line. The first path controller recognizes connection state between the second logical HBA and the logical unit to be on-line. The first shadow LPAR transfers differential information of logical resource information of the first LPAR to the second shadow LPAR. The second hypervisor makes the transferred differential information of logical resource information of the first LPAR reflected on the second LPAR. The first hypervisor makes connection state between the first logical HBA and the logical unit off-line. The second hypervisor starts operation of the migrated second LPAR when completion notification of the reflection is received and the first path controller stops operation by start of operation of the second LPAR. The second path controller recognizes connection state between the fourth logical HBA having the second WWN and the logical unit to be on-line. The first hypervisor logs out connection between the first logical HBA and the logical unit.

Effects obtained by the representative of the inventions disclosed in this specification are described briefly as follows:

That is, according to the effects obtained by the representative, when operation is taken over to migration destination in the state the LPAR before migration is operated, the same disk as that before migration can be accessed just after OS of logical partition is operated in migration destination.

Other objects, features and advantages of the invention will become apparent from the following description of the embodiments of the invention taken in conjunction with the accompanying drawings.

BRIEF DESCRIPTION OF THE DRAWINGS

FIG. 3A is a flow chart showing a second half of the method of realizing migration processing of LPAR and disk access in migration destination;

FIG. 4 is a diagram showing connection state of FC-HBA and LU 134 assigned to LPAR of migration source and migration destination;

FIG. 7 is a diagram showing information set in memory at the time that driver 121 of LPAR of migration source transfers data to FC-HBA 117 and disk 134;

FIG. 8 is a diagram showing response of firmware of FC-HBA 217 to driver 221 of LPAR 212 of migration destination after data transfer;

FIG. 9 is a flow chart showing operation that hypervisor 214 of migration destination requests firmware of FC-HBA 217 to make logging-in;

FIG. 10 is a diagram showing contents written in request area to firmware of FC-HBA;

FIG. 11 is a diagram showing contents written in response area to firmware of FC-HBA.

DESCRIPTION OF THE EMBODIMENTS

Embodiments to which the present invention is applied are now described with reference to the accompanying drawings.

Embodiment 1

Figure 1:
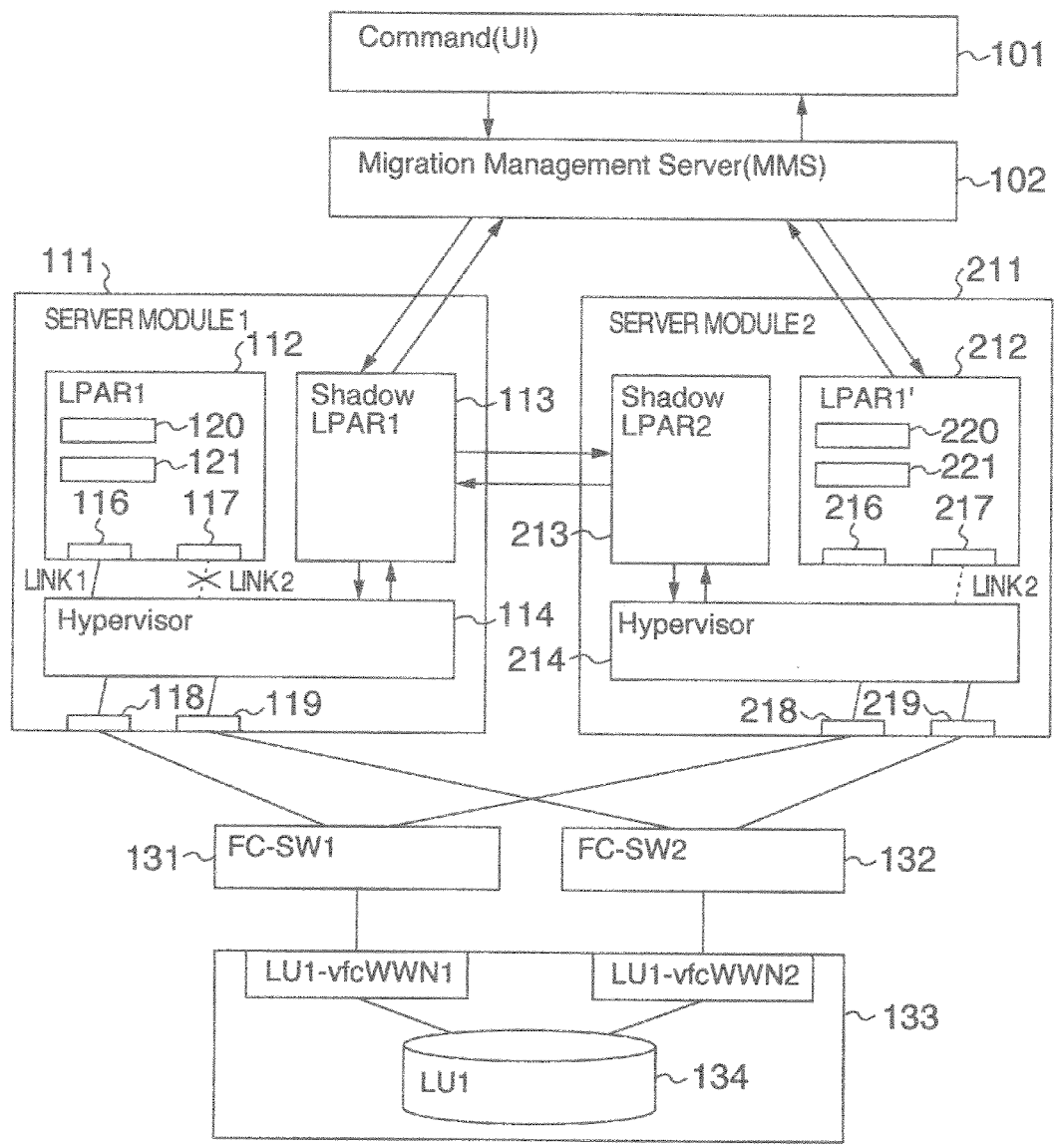
FIG. 1 is a schematic diagram illustrating a computer system of the present invention.

Referring now to FIG. 1, configuration of a virtual computer system of the embodiment 1 is described.

Servo-modules 111 and 211 have basically the same configuration and redundantly include FC-HBAs 118, 119 (218, 219) and NICs. Hypervisor 114 (214) is virtualization mechanism which makes one physical server look like a plurality of logical servers. Servo-modules 111 and 112 include LPAR 112 (212) and shadow LPAR 113 (213) which are constructed in one hypervisor to be operated. Shadow LPAR is LPAR exclusive to hypervisor and invisible to users and hypervisor can indirectly take in the function provided in shadow LPAR through LPAR.

FC-HBAs 118, 119 (218, 219) each have one WWN to one FC port as HBA address in order to make communication. LPAR 112 (212) also has two logical HBAs 116, 117 (216, 217) which are given inherent WWNs such as VfcWWN1, VfcWWN2 (VfcWWN3, VfcWWN4), respectively.

Storage or memory device 133 includes a disk unit 134 named LU (logical unit) logically stipulated. Connection information representing which server the disk unit 134 is connected to is managed by controller in storage device 133. That is, LU 134 is connected to server 112 having WWN of VfcWWN1. The function of setting this connection relation is named LUN security setting function.

Multipath controller 120 for controlling two paths including path (link 1) between LU 134 and FC-HBA 116 and path (link 2) between LU 134 and FC-HBA 117 is operating in LPAR 112. Which of the two paths is used by control of multipath controller 120 and FC-HBA driver 121 makes exchange with firmware of FC-HBA to make disk access. The multipath controller 120 can be realized by multipath control software, for example, although it is not limited thereto.

The multipath controller 120 of the embodiment can be realized by installing multipath control software in OS. Accordingly, when LPAR 112 is migrated to LPAR 212, multipath controller 120 is also migrated. The migrated multipath controller is assumed to be multipath controller 220. Similarly, since FC-HBA driver 121 is also installed in OS, the FC-HBA driver is also migrated when LPAR 112 is migrated to LPAR 212. The migrated FC-HBA driver is assumed to be driver 221.

Multipath controller 120 monitors path state (connection state) periodically. Further, multipath controller 120 can set monitoring interval. Multipath controller 120 can set path state to usable state (decide to be named on-line) in which LU 134 can be accessed again without user's intervention when path state is recovered from unusable state (decide to be named offline) in which LU 134 cannot be accessed. This setting is named automatic failback setting. In the embodiment 1, setting in which monitoring interval of this path is set to several seconds and the automatic failback setting are required.

The reason that redundant configuration of HBA is adopted in the virtual computer system to which the present invention is applied is described.

When LPAR is migrated, WWN is taken over between migration source and migration destination and accordingly WWN of migration source before migration is the same as WWN of migration destination after migration.

When LPAR is migrated in its operating state, OS of migration destination does not notice that LPAR has been migrated and accordingly there is a possibility that disk access is made just after OS is operated in LPAR of migration destination.

It is necessary to make logging-in so as to secure path between FC and LU 134 physically before OS is operated in migration destination so that OS of migration destination can make disk access just after migration. On the other hand, since there is a possibility that disk access is made until just before migration even in the migration source, it is necessary that logging-in has been made. However, it is impossible that migration source and migration destination make logging-in to the same disk by the same WWN. Furthermore, it takes time to make logging-in of FC.

Accordingly, the virtual computer system to which the present invention is applied adopts redundant configuration of HBA. First, one of FC-HBAs configured redundantly before migration is logged out in migration source. WWN of FC-HBA of migration source unoccupied by logging-out is used to make logging-in before OS is operated in migration destination. Consequently, OS in LPAR 112 of migration source can access LU 134 just before migration of LPAR and OS in LPAR 212 of migration destination can access LU 134 just after migration of LPAR.

Figure 12:
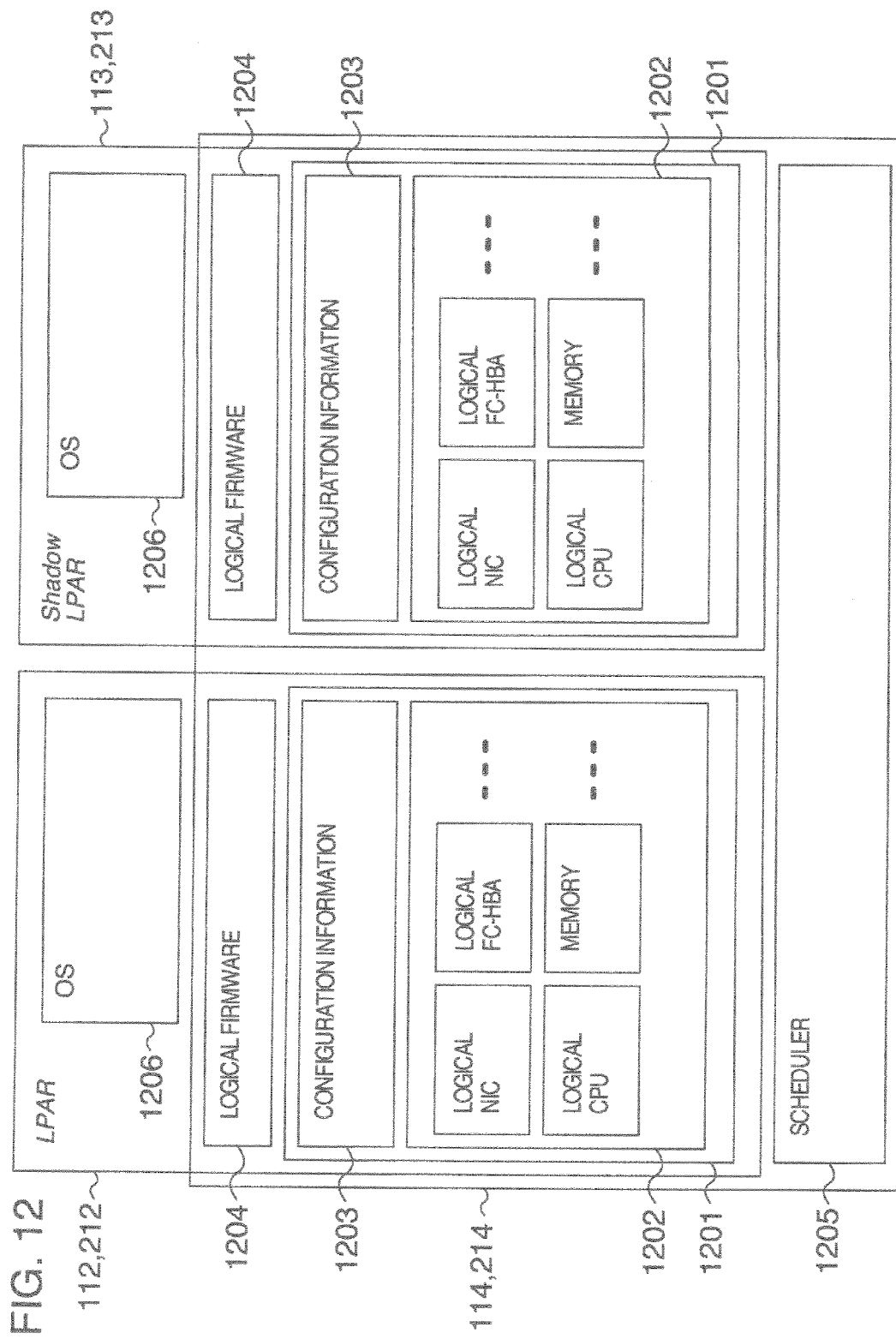
FIG. 12 is a schematic diagram illustrating a computer.

Referring now to FIG. 12, configuration of hypervisors 114 and 214 which serve important function in the present invention is described. FIG. 12 is a schematic diagram illustrating LPAR 112 (212) and shadow LPAR 113 (213) constructed in hypervisor 114 (214).

Hypervisor 114 (214) includes logical resources (1202) having logical CPU, memory, logical FC-HBA and logical NIC assigned to LPAR, LPAR management (1201) for managing configuration information (1203) related to LPAR such as WWN (VfcWWN) assigned to LPAR and order of OS (1206) started upon activation of LPAR and scheduler (1205) for selecting process having higher priority out of logical firmware (1204) such as logical BIOS and logical EFI, programs (processes) of logical CPU and control processes in hypervisor to be changed. In the embodiment, information concerned in state of logical resources (1202) such as logical CPU, memory and logical FC-HBA controlled by management of LPAR is decided to be named device memory information.

Figure 2:
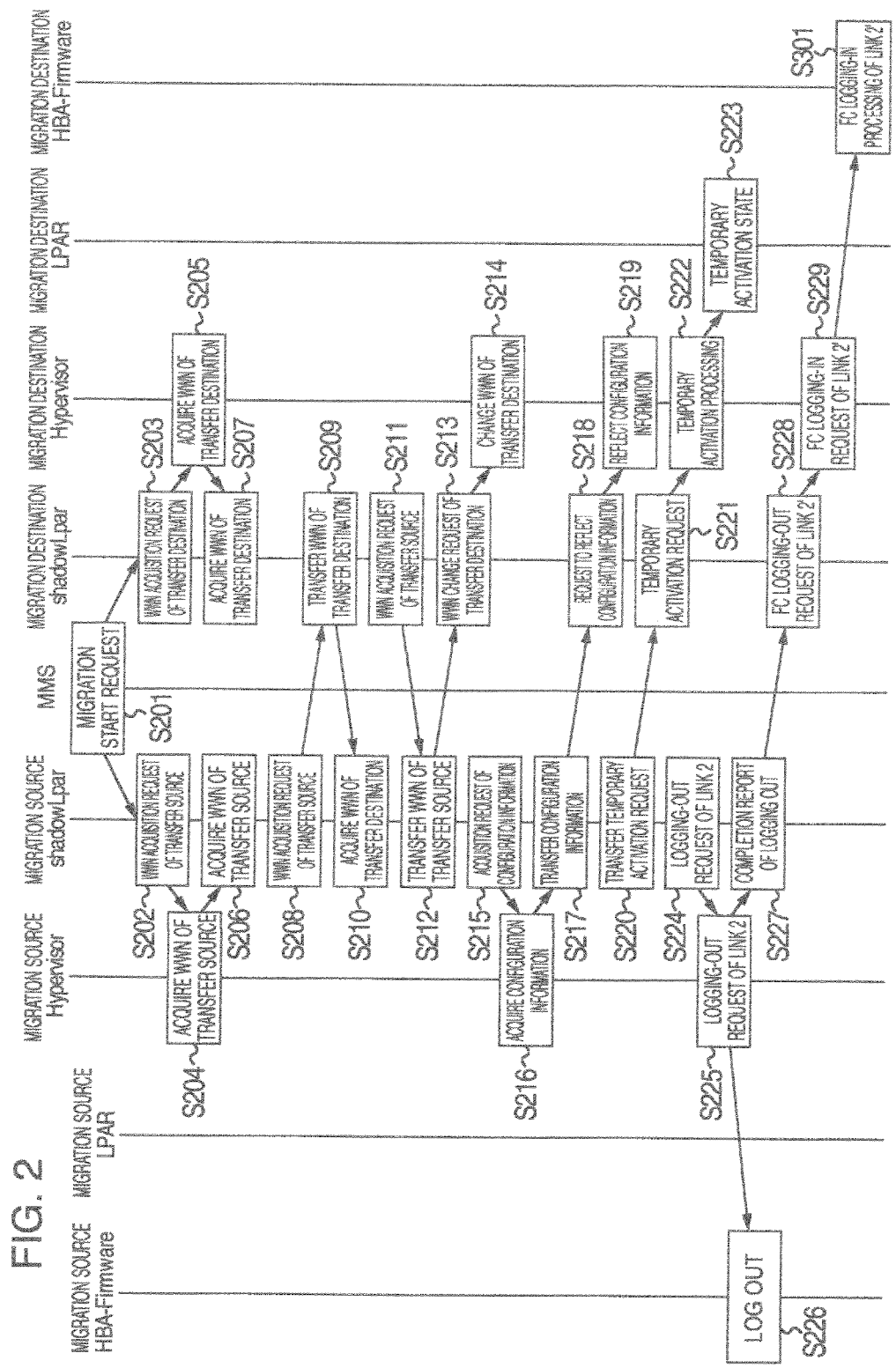
FIG. 2 is a flow chart showing a first half of a method of realizing migration processing of LPAR and disk access in migration destination.
Figure 3B:
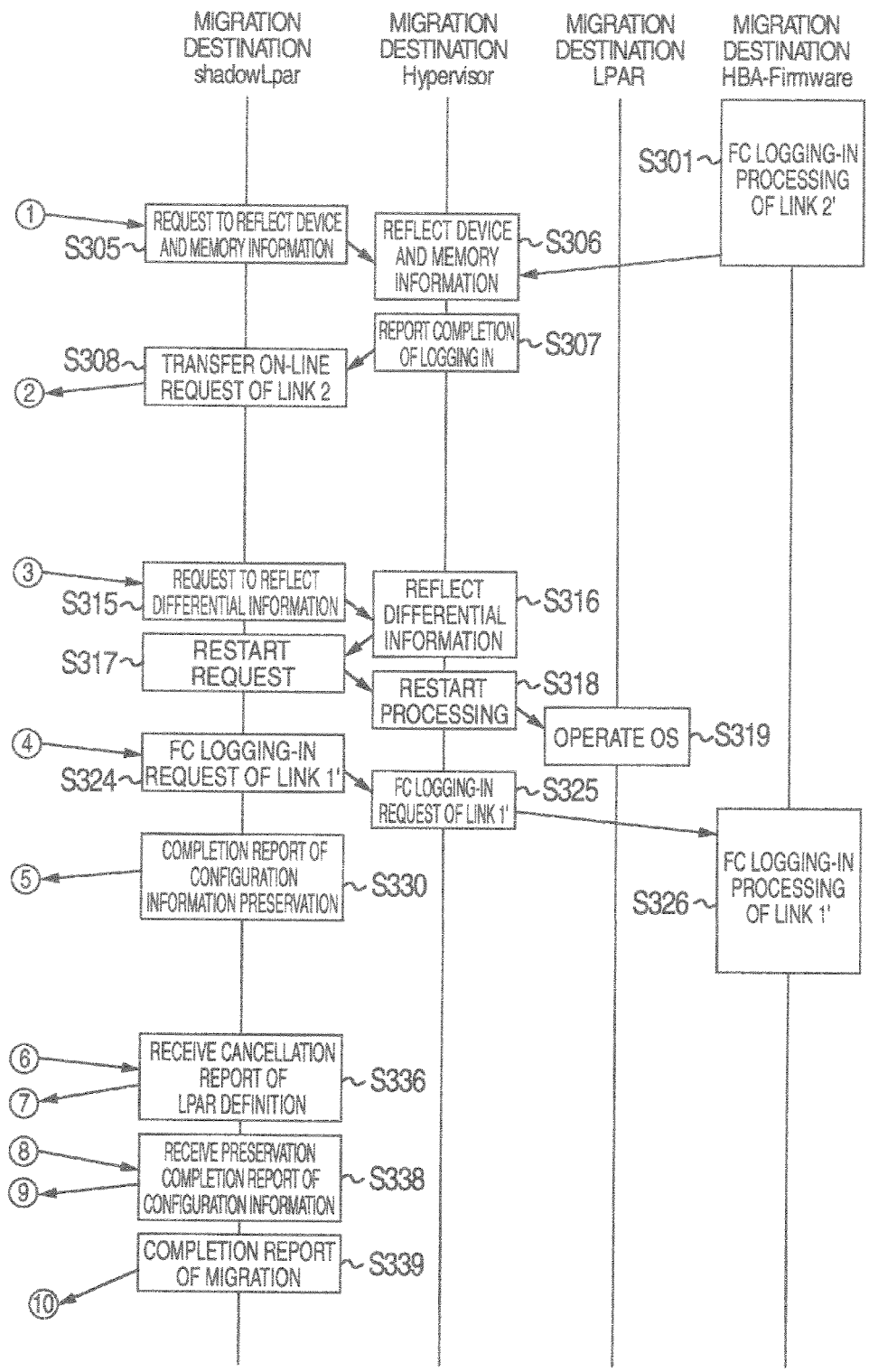
FIG. 3B is a flow chart showing a second half of the method of realising migration processing of LPAR and disk access in migration destination.

Referring now to FIGS. 2, 3A and 3B, a summary as to how logging-in processing of FC is previously made before OS is operated in migration destination and LU 134 can be accessed immediately after operation of OS in the whole of processing for taking over processing to migration destination in the state that LPAR 112 is operated is described. In the drawings of FIGS. 3A and 3B, each of sets of numerals "1"-"10" respectively corresponds thereto.

(S201) Migration start requests are sent from migration management server (MMS) (102) to shadow LPARs (113, 213) of migration source and migration destination through user interface 101.

(S202, S203) Shadow LPARs (113, 213) of migration source and migration destination send acquisition request of WWN to hypervisors (114, 214) of migration source and migration destination, respectively.

(S204, S205) Hypervisors (114, 214) return WWNs of migration source and migration destination as response.

(S206) Shadow LPAR of migration source acquires WWNs (VfcWWN1, VfcWWN2) assigned to LPAR 112 of migration source.

(S207) Shadow LPAR of migration destination acquires WWNs (VfcWWN3, VfcWWN4) assigned to LPAR 212 of migration destination.

(S208) Shadow LPAR 113 of migration source sends WWN acquisition request of migration destination to shadow LPAR 213 of migration destination.

(S209) Shadow LPAR 213 of migration destination returns WWN of migration source to shadow LPAR 113 of migration source as response.

(S210) Shadow LPAR 113 of migration source acquires WWNs (VfcWWN3, VfcWWN4) from shadow LPAR 213 of migration destination.

(S211) Similarly, shadow LPAR 213 of migration destination sends WWN acquisition request to shadow LPAR 113 of migration source.

(S212) Shadow LPAR 113 of migration source transfers WWN of migration source to shadow LPAR 213 of migration destination.

(S213) Shadow LPAR 213 which has received WWNs (VfcWWN1, VfcWWN2) of migration source from shadow LPAR 113 of migration source sends change request of WWN to hypervisor 214 of migration destination.

(S214) Next, hypervisor 214 which has received the WWN change request changes WWN assigned to LPAR 213 from WWNs (VfcWWN3, VfcWWN4) assigned in migration destination to WWNs (VfcWWN1, VfcWWN2) assigned in migration source.

(S215) When shadow LPAR 113 of migration source transfers WWN of migration source, shadow LPAR 113 of migration source sends acquisition request of configuration information required to be acquired until temporary activation is performed in migration destination to hypervisor 114.

(S216) Hypervisor 114 of migration source acquires configuration information (1203).

(S217) Next, shadow LPAR 113 of migration source which has received configuration information transfers configuration information (1203) to shadow LPAR 213 of migration destination.

(S218) Shadow LPAR 213 of migration destination which has received configuration information requests hypervisor 214 of migration destination to reflect configuration information (1203).

(S219) Hypervisor 214 which has received request reflects configuration information (1203).

(S220) Shadow LPAR 113 of migration source produces logical device after transfer of configuration information (1203) and transfers temporary activation request for suspending logical CPU until restart request of logical CPU of LPAR 212 of migration destination is received to shadow LPAR 213 of migration destination.

(S221) Shadow LPAR 213 which has received temporary activation request sends temporary activation request to hypervisor 214 of migration destination.

(S222) Hypervisor 214 which has received temporary activation request starts temporary activation processing of LPAR 212 of migration destination.

(S223) When temporary activation processing of hypervisor 214 of migration destination is completed, LPAR 212 of migration destination enters into temporary activation state (state that logical CPU is being suspended while waiting for restart).

(S224) Shadow LPAR 113 which has transferred temporary activation request requests port of FC-HBA 117 to make logging-out (logging-out of link 2).

(S225) Hypervisor 114 of migration source which has received logging-out request of FC-HBA 117 sends logging-out request of link 2 to firmware of FC-HBA 117.

(S226) Logging-out processing of link 2 is performed by firmware of FC-HBA 117.

(S227) When response to logging-out request of link 2 of FC-HBA 117 is returned from hypervisor 114, shadow LPAR 113 of migration source transfers completion report of logging-out of link 2 of FC-HBA 117 to shadow LPAR 213 of migration destination.

(S228) Shadow LPAR 213 of migration destination which has received completion report of logging-out of FC-HBA 117 sends logging-in request of link 2' of FC-HBA 217 to hypervisor 214 of migration destination.

(S229) Hypervisor 214 of migration destination which has received FC logging-in request of FC-HBA 217 sends togging-in processing request of link 2' to firmware of FC-HBA 217.

(S301) Firmware of FC-HBA 217 which has received logging-in processing request performs logging-in processing of link 2' of FC-HBA 217.

(S302) While logging-in processing of FC-HBA 217 is performed in migration destination, shadow LP (113) of migration source requests hypervisor 114 of migration source to acquire states of devices assigned to LPAR 112 and device and memory information (1202) concerning memory.

(S303) Hypervisor 114 of migration source acquires device and memory information (1202).

(S304) Shadow LPAR 113 of migration source which has acquired device and memory information (1202) transfers device and memory information (1202) acquired to shadow LPAR 213 of migration destination.

(S305) Shadow LPAR 213 of migration destination which has acquired device and memory information (1202) requests hypervisor 214 to reflect device and memory information (1202).

(S306) Hypervisor 214 of migration destination which has received reflection request reflects device and memory information (1202).

(S307) When response of firmware of FC-HBA 217 is not returned after reflection of device and memory information (1202), hypervisor 214 of migration destination waits for response. After response is returned, hypervisor 214 of migration destination notifies completion of logging-in of link 2' of FC-HBA 217 to shadow LPAR 213 of migration destination.

(S308) Shadow LPAR 213 of migration destination which has known completion of logging-in of FC-HBA 217 transfers on-line request to shadow LPAR 113 of migration source in order to make multipath controller 120 recognize that path between FC-HBA 117 of migration source and LU 134 is on-line. However, FC-HBA 117 of migration source is logged out from link 2 in step S226 and path (link 2) between FC-HBA 117 and LU 134 is not connected physically.

(S309) Shadow LPAR 113 of migration source which has received on-line request concerning path between FC-HBA 117 and LU 134 from shadow LPAR 213 of migration destination requests hypervisor 114 of migration source to make path between FC-HBA 117 and LU 134 on-line. This reason is that when multipath controller 120 of migration source does not recognize that path between FC-HBA 117 of migration source corresponding to FC-HBA 217 of migration destination and LU 134 is on-line, multipath controller 220 of migration destination corresponding to multipath controller 120 migrated considers that path between FC-HBA 217 and LU 134 is off-line, so that multipath controller 220 does not access LU 134.

Multipath controller 220 corresponding to multipath controller 120 migrated migrates at the same time that LPAR 1 is migrated to LPAR 2 and continues operation. Multipath control software is incorporated into OS to be stored in disk and developed in memory. Accordingly, multipath controller 120 of LPAR 1 is migrated to LPAR 2 at the time of step S304 in which memory transfer is performed and step S314 in which differential information is transferred. However, multipath controller 220 is operated after logical CPU of LPAR 212 of migration destination is restarted.

(S310) Hypervisor 114 of migration source which has received on-line request concerning path between FC-HBA 117 and LU 134 performs on-line processing when multipath controller 120 monitors path.

(S311) After on-line processing of step S310, path between FC-HBA 117 and LU 137 becomes on-line. (Multipath controller 120 monitors state of path periodically. Accordingly, on-line processing is processing of returning proper response upon monitoring of state.) After proper response is returned, path between FC-HBA 117 and LU 134 is on-line by failback function of multipath controller 120. However, FC-HBA 117 is left to be logged out physically in migration source (both of migration source and migration destination cannot be logged in by the same WWN).

After on-line processing of step S310, path between FC-HBA 117 and LU 134 is viewed as being on-line from multipath controller 120 and accordingly there is a possibility that disk access is made until migration source is deactivated.

As described above, processing of returning proper response upon monitoring of state by multipath controller 120 and processing at the time that multipath controller 120 makes disk access after on-line processing of path between FC-HBA 117 and LU 134 are described with reference to FIGS. 5 and 6.

(S312) Shadow LPAR 113 of migration source which has received response to on-line request concerning path between FC-HBA 117 and LU 134 from hypervisor 114 of migration source requests hypervisor 114 of migration source to acquire differential information produced by change in LPAR of migration source after transfer of device and memory information 1202 of transfer source.

(S313-S316) Hypervisor 114 of migration source which has received acquisition request of differential information acquires differential information until an amount of differential information is equal to or smaller than a fixed amount. Shadow LPAR 113 of migration source which has received differential information transfers it to shadow LPAR 213 of migration destination. Shadow LPAR 213 of migration destination which has received differential information requests hypervisor 214 of migration destination to reflect differential information.

Hypervisor 114 of migration destination which has received reflection request of differential information from shadow LPAR 213 of migration destination reflects differential information. When differential information amount is equal to or smaller than fixed amount, hypervisor 114 of migration source stops logical CPU assigned to LPAR 112 of migration source and acquires remaining differential information. Shadow LPAR 113 of migration source which has acquired remaining differential information transfers information acquired to shadow LPAR 213 of migration destination. Hypervisor 214 of migration destination reflects remaining differential information.

Response indicating that path between LU 134 and FC-HBA 116 is off-line is returned to periodic monitoring and disk access using path between LU 134 and FC-HBA 116 from just before logical CPU assigned to LPAR 112 of migration source is stopped, so that multipath controller 120 is made to recognize it to be off-line.

In order to recognize that path between LU 134 and FC-HBA 116 is off-line, a value is set in MMIO, for example, and interrupt is issued to driver, so that response representing that it is off-line can be returned to driver.

(S317) Shadow LPAR 213 of migration destination which has received reflection completion notification of differential information from hypervisor 214 of migration destination sends restart request of LPAR of migration destination to hypervisor 214 of migration destination so as to restart logical CPU being suspended.

(S318) Hypervisor 214 of migration destination which has received restart request restarts LPAR 212 of migration destination.

(S319) LPAR 212 of migration destination restarts logical CPU and resumes operation of OS.

(S320) After transfer of differential information, shadow LPAR 113 of migration source requests port of FC-HBA 116 to log out link 1.

(S321) Hypervisor 114 of migration source which has received logging-out request sends logging-out request of link 1 to firmware of FC-HBA 116.

(S322) Firmware of FC-HBA 116 which has received logging-out request performs logging-out processing of link 1.

(S323) When response to logging-out request is returned from hypervisor 114, shadow LPAR 113 of migration source transfers completion report of logging-out of link 1 of FC-HBA 116 to shadow LPAR 213 of migration destination.

(S324) Shadow LPAR 213 of migration destination which has received logging-out completion report of FC-HBA 116 sends logging-in request of link 1' of FC-HBA 216 to hypervisor 214 of migration destination.

(S325) Hypervisor 214 of migration destination which has received FC logging-in request sends logging-in processing request of link 1' of FC-HBA 216 to firmware of FC-HBA 216.

(S326) Firmware of FC-HBA 216 which has received logging-in processing request performs logging-in processing of link 1'. Path (link 1') between LU 134 and FC-HBA 216 becomes on-line automatically after completion of logging in by periodic monitoring by multipath controller 220 and failback.

(S327) After completion report of logging-out, shadow LPAR 113 of migration source sends deactivation request of LPAR 112 to hypervisor 114 of migration source.

(S328) Hypervisor 114 which has received deactivation request deactivates LPAR 112.

(S329) LPAR 112 is deactivated.

(S330) After logging-in request of step S325, shadow LPAR 213 of migration destination preserves or stores configuration information and reports preservation completion of configuration information to shadow LPAR 113 of transfer source after completion of preservation.

(S331) Shadow LPAR 113 of migration source which has received preservation completion report of configuration information of migration source sends change request of WWN of migration source to hypervisor 114.

(S332) Hypervisor 114 which has received request changes assigned to LPAR 113 of migration source to WWN (VfcWWN3, VfcWWN4) assigned to migration source originally.

(S333) After change of shadow LPAR of migration source sends cancellation request of LPAR definition of LPAR 112 to hypervisor 114.

(S334) Hypervisor 114 which has received request cancels definition LPAR 112.

(S335) Shadow LPAR 113 of migration source which has known that LPAR definition of LPAR 112 has been cancelled transfers cancellation completion report of LPAR definition to shadow LPAR 213 of migration destination.

(S336) Shadow LPAR 213 of migration destination which has received cancellation completion report of LPAR definition notifies to shadow LPAR 113 of transfer source that cancellation completion report of LPAR definition has been received.

(S337) Shadow LPAR 113 of migration source which has been notified from shadow LPAR of migration destination that cancellation completion report of LPAR definition has been received preserves or stores configuration information and transfers preservation completion report of configuration information to shadow LPAR 213 of transfer destination after completion of preservation.

(S338) Shadow LPAR 213 of migration destination which has received preservation completion report of configuration information from shadow LPAR 113 of migration source notifies to shadow LPAR 113 of transfer source that preservation completion report of configuration information has been received.

(S339) Shadow LPAR 213 which has notified to shadow LPAR 113 of migration source that preservation completion report of configuration information has been received reports completion of migration to MMS 102.

(S340) Shadow LPAR 113 of migration source which has known that shadow LPAR 213 of migration destination has received preservation completion report of configuration information reports completion of migration to MMS 102.

(S341) MMS which has received completion report of migration from shadow LPARs of migration source and destination completes migration.

Referring to FIG. 4, transition of physical connection ("physical" in FIG. 4) between FC-HBA 116 and FC-HBA 117 connected to LPAR 112 of migration source and FC-HBA 216, FC-HBA 217 and LU 134 connected to LPAR 212 of migration destination and connection state of path ("in multipath controller" in FIG. 4) viewed from multipath controllers 120 and 220 are described.

T0 (S201 to S224) is initial state. In initial state, LU 134 is connected to FC-HBAs 116 and 117 of migration source.

T1 (until processing of S225 to S301 is completed) is period from time that firmware of FC-HBA 117 performs logging-out processing (S226) after start of migration until logging-in processing is completed in migration destination and in this period only FC-HBA 116 of migration source is connected to LU 134.

T2 (after completion of processing of S301 to until S309) is period from after logging-in processing in migration destination is completed until before hypervisor 114 of migration source performs on-line processing (S310) and in this period FC-HBA 116 of migration source and FC-HBA 217 of migration destination are connected to LU 134. Since logical CPU is not operated in migration destination, multipath controller 120 is not operated and accordingly "X" is described in multipath controller 120.

T3 (S310 to S312) is period from time that hypervisor 114 of migration source performs on-line processing of path between LU 134 and FC-HBA 117 until path between LU 134 and FC-HBA 116 and path between LU 134 and FC-HBA 117 are subjected to off-line processing just before logical CPU of migration source is stopped. It is shown as if path between FC-HBA 117 and LU 134 is on-line before migration so that multipath controller 220 of LPAR 212 uses path between FC-HBA 217 and LU 134 after migration. However, the path is in logged-out state physically. State of path between FC-HBA 117 and LU 134 viewed from multipath controller 120 is changed to on-line state from state of T2.

T4 (S313 to S318) is period from time that path between LU 134 and FC-HBA 116 is subjected to off-line processing just before logical CPU is stopped until LPAR of migration destination is restarted. State of path between FC-HBA 116 and LU 134 viewed from multipath controller 120 is changed to off-line state from state of T3.

T5 (S319 to S322) is period after restart of LP 212 of migration destination until firmware of FC-HBA 116 of migration source performs logging-out processing. State of path between FC-HBA 217 and LU 134 viewed from multipath controller 220 of migration destination is changed to on-line state from state of T4. Since multipath controller 120 of LPAR 1 is migrated to be multipath controller 220 of LPAR 212, "X" is described "in multipath control" of migration source after T5.

T6 (until processing of S323 to S326 is completed) is period after firmware of FC-HBA 116 of migration source performs logging-out processing until firmware of FC-HBA 216 performs logging-in processing in migration destination to complete logging-in processing. Physical connection between FC-HBA 116 of migration source and LU 134 is changed to logging-out state from state of T5.

T7 (after completion of processing of S326) is period until failback processing of multipath controller 222 of migration destination is performed. Physical connection between FC-HBA 216 of migration source and LU 134 is changed from state of T5 and FC-HBA 216 is logged in.

T8 is period after failback processing of multipath controller 220 of migration destination. Recognition of multipath controller 220 for path between FC-HBA 216 of migration destination and LU 134 is changed from state of T7 to on-line state.

Figure 5:
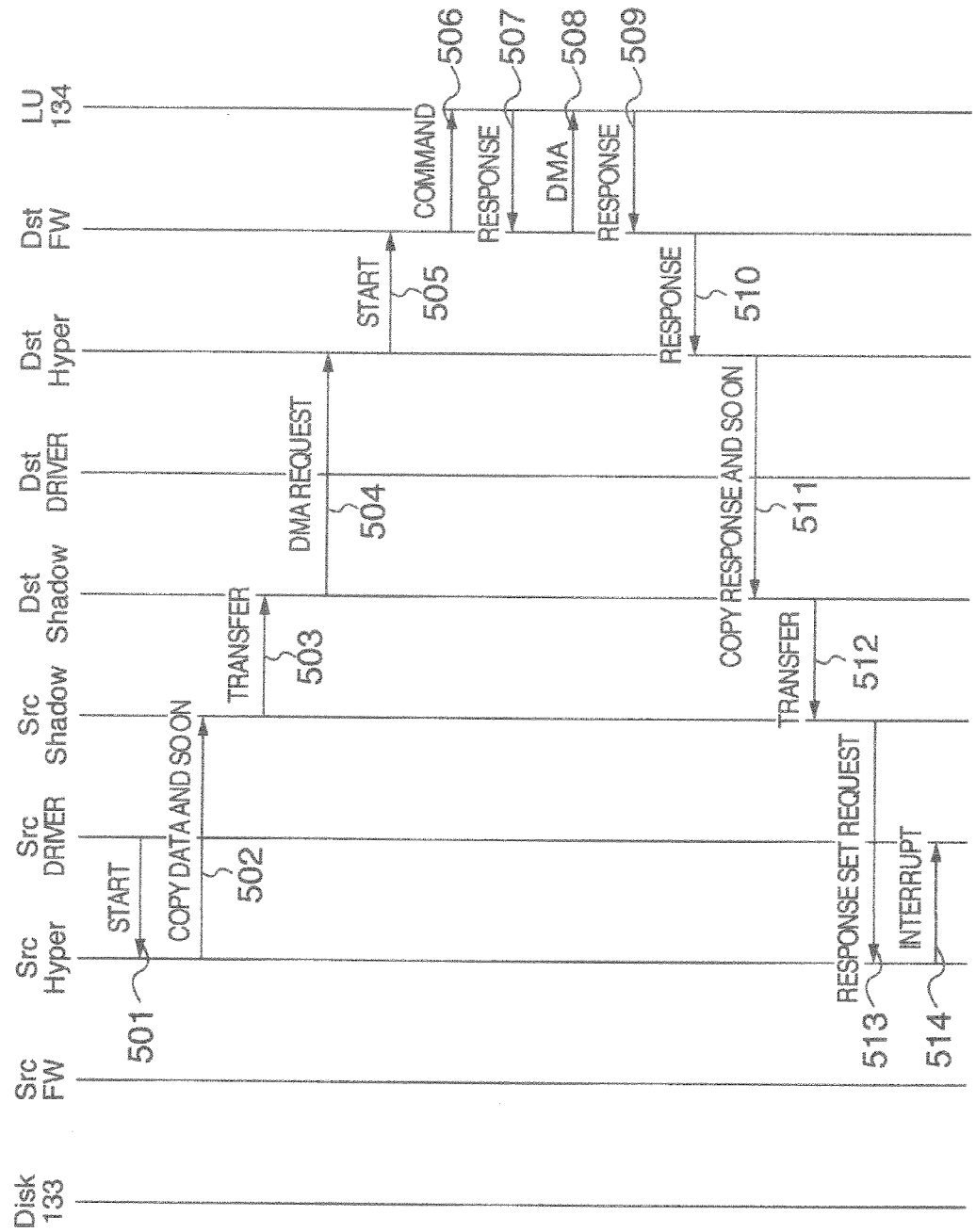
FIG. 5 is a timing chart showing operation at the time that OS of migration source performs writing in LU 134 using path between FC-HBA 117 and LU 134 which are logged out physically.

Referring to FIG. 5, operation at the time that OS performs writing in LU 134 after completion of on-line processing in S310 of FIG. 3 is described. In FIGS. 5 and 6, "Src" represents transfer source and "Dst" represents transfer destination. Further, FW represents firmware of FC-HBA Driver is FC-HBA driver, Hyper is hypervisor and Shadow is shadow LPAR.

(S501) Driver 121 of LPAR 112 of migration source sets information (address, number of bytes and so on and refer to FIG. 7 for information contained therein) necessary at the time that FC-HBA 117 makes exchange with disk 133, address for accessing disk and data to be written in memory and writes value in register to thereby issue start request to firmware of FC-HBA 117.

(S502) Hypervisor 114 of migration source which has trapped start request corner and to firmware of FC-HBA 117 delivers information set in memory by driver to shadow LPAR 113 of migration source.

(S503) Shadow LPAR 113 of migration source transfers received information to shadow LPAR 213 of migration destination.

(S504) Shadow LPAR which has received information from shadow LP of transfer source sends DMA (direct memory access) request to hypervisor of migration destination.

(S505) Hypervisor 214 of migration destination which has received DMA request investigates address for accessing information of FIG. 7 from information received from shadow LPAR and, after investigation of address of data to be written and reading/writing from information of FIG. 7, sets information of FIG. 7, address thereof and write data in investigated memory location, writing value in register to thereby issue start request to firmware of FC-HBA 217 of migration destination.

(S506) Firmware of FC-HBA 217 of migration destination which has received start request sends command to disk 133 on the basis of information FIG. 7.

(S507) Disk 133 which has received command returns response informing that preparation is completed to firmware of FC-HBA 217 of migration destination.

(S508) Data transferred from migration source after response is written in LU 134 of disk 133.

(S509) After completion of writing in LU 134, response is returned from disk 133 to firmware of FC-HBA 217 of migration destination.

(S510) Firmware of FC-HBA 217 of migration destination which has received response returns response to driver 221 of LPAR 212 of migration destination.

(S511) Hypervisor 214 of migration destination which has trapped response delivers this response and address of this response to shadow LPAR 213 of migration destination.

(S512) Shadow LPAR 213 of migration destination which has received response transfers this response and address of this response to shadow LPAR 113 of migration source.

(S513) Shadow LPAR 113 of migration source which has received data from migration destination sends response set request to hypervisor 114 of migration source.

(S514) Hypervisor 114 of migration source which has received request sets response to designated address and issues interrupt for notifying response to driver 121 of migration source. After path between FC-HBA 117 of migration source and LU 134 becomes on-line in S313, processing of FIG. 5 is repeated for each writing request while disk access using path between FC-HBA 117 and LU 134 is continued.

Figure 6:
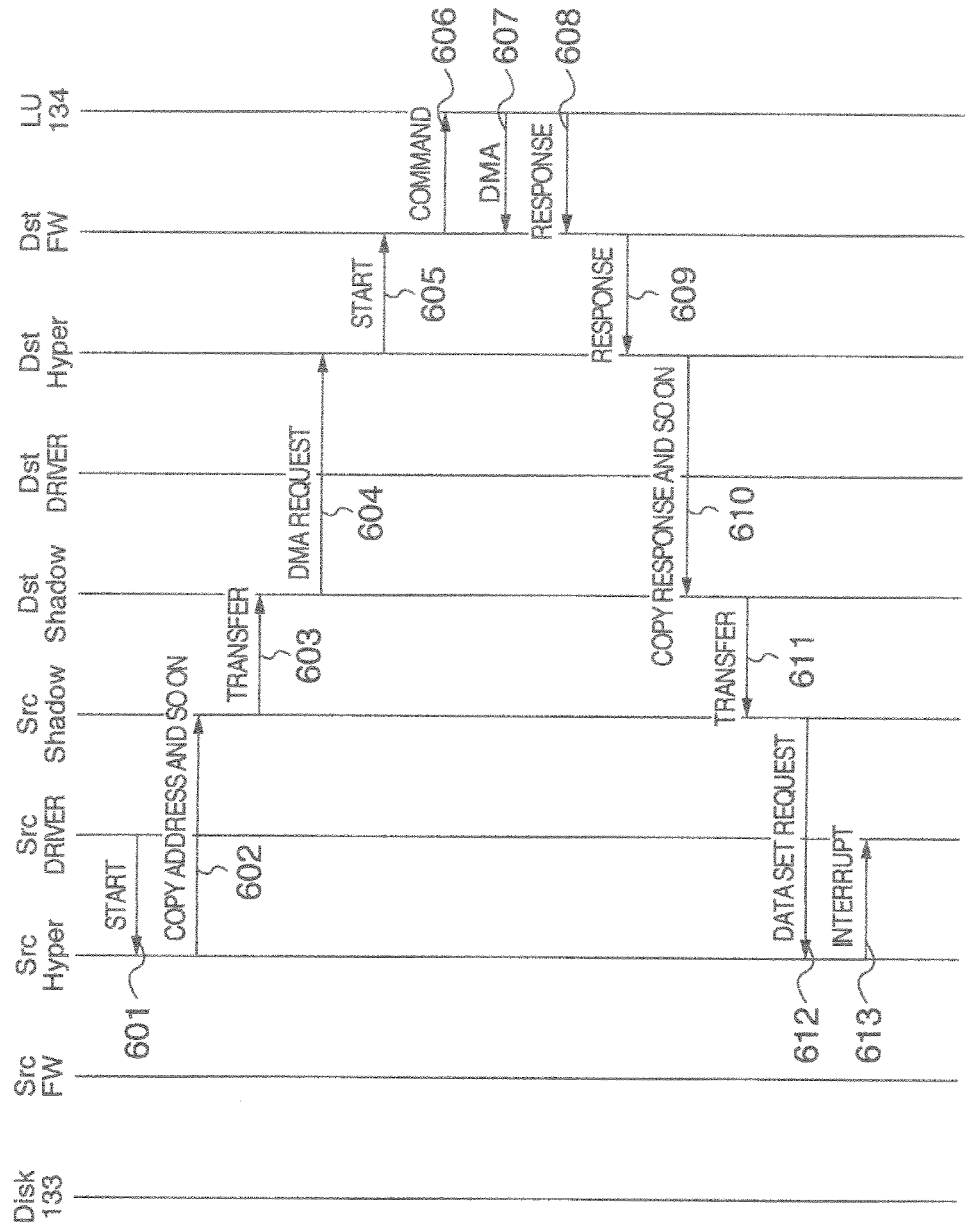
FIG. 6 is a timing chart showing operation at the time that OS of migration source is to read contents of LU 134 using path between FC-HBA 117 and LU 134 which are logged out physically.

Referring to FIG. 6, operation at the time that OS reads information of LU 134 after completion of on-line processing concerned in path between FC-HBA 117 and LU 134 in S310 of FIG. 3 is described.

(S601) Driver 121 of LPAR 11 of migration source sets information (address, number of bytes and so on and refer to FIG. 7 for information contained therein) necessary at the time that FC-HBA 117 makes exchange with disk 133 and address for accessing disk in memory and writes value in register to thereby issue start request to firmware of FC-HBA 117.

(S602) Hypervisor 114 of migration source which has trapped start request delivers information set in memory by driver to shadow LPAR 113 of migration source.

(S603) Shadow LP 113 of migration source transfers received information to shadow LP 213 of migration destination.

(S604) Shadow LPAR which has received information from shadow LPAR of transfer source issues DMA request to hypervisor of migration destination.

(S605) Hypervisor 214 of migration destination which has received DMA request investigates address for accessing information of FIG. 7 from information received from shadow LPAR and, after investigation of address of data to be read and reading/writing from information of FIG. 7, sets information of FIG. 7 and address thereof in investigated memory location, writing value in register to thereby issue start request to firmware of FC-HBA 217.

(S606) Firmware of FC-HBA 217 of migration destination which has been started sends command to disk 133 on the basis of information FIG. 7.

(S607) Information of LU 134 is stored in memory designated in FIG. 7.

(S608) After completion of storing information in memory, response is returned from disk 133 to firmware of FC-HBA 217 of migration destination.

(S609) Firmware of FC-HBA 217 of migration destination which has received response returns response to driver 221 of LPAR 212 of migration destination.

(S610) Hypervisor 214 of migration destination which has trapped response delivers this response, address of this response and read data to shadow LPAR 213 of migration source.

(S611) Shadow LPAR 213 of migration destination which has received read data response and address thereof transfers read data, response and address thereof to shadow LPAR 113 of migration source.

(S612) Shadow LPAR 113 of migration source which has received data from migration destination sends read data set request to hypervisor 114 of migration source.

(S613) Hypervisor 114 of migration source which has received request sets read data and response in designated address and issues interrupt for informing response to driver 121 of migration source. After path between FC-HBA 117 of migration source and LU 134 becomes on-line in S313, processing of FIG. 6 is repeated for each reading request while disk access using path between FC-HBA 117 and LU 134 is continued.

Referring to FIG. 7, contents of information set in memory by driver 121 of LP 112 of migration source so that FC-HBA 117 makes exchange with disk 133 are described.

Driver 121 of LPAR 112 of migration source writes information such as port address of fibre channel of transmission destination, LU number, command to disk, memory address for data transfer, data length and transfer direction (write/read) of data into area designated by address in memory when writing or reading for LU 134 is performed.

Referring to FIG. 8, contents of response returned to OS driver of LPAR 112 of migration destination by firmware of FC-HBA 217 after transfer are described.

Firmware of FC-HBA 117 returns state information such as normal end and detection of abnormality, error information indicating trouble factor, error code indicating detailed trouble factor and so on to area designated by address in memory as response after transfer.

Figure 9:
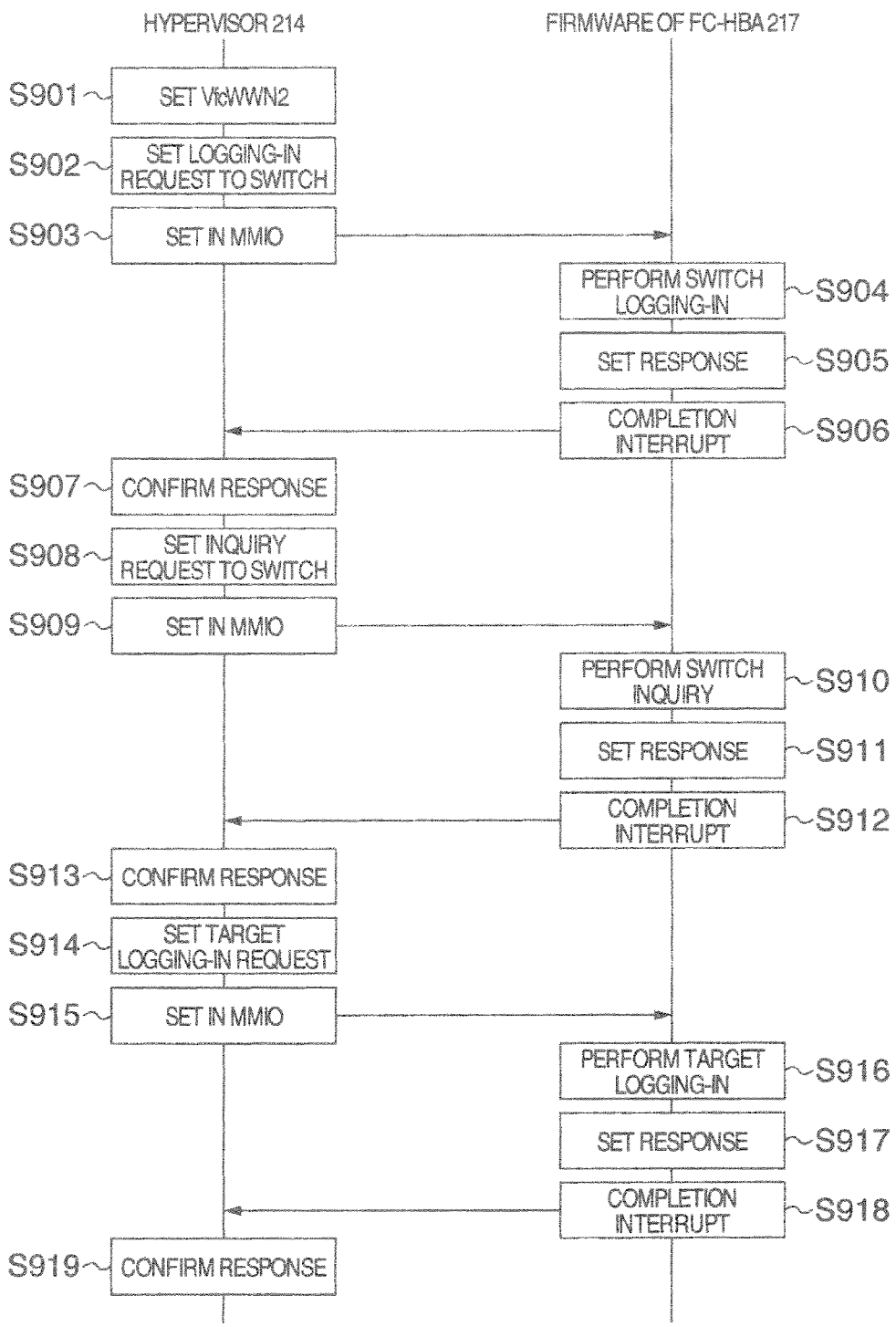

FIG. 9 shows a detailed flow at the time that hypervisor 214 of migration destination requests firmware of FC-HBA 217 to make logging-in. FIG. 9 shows processing in S229 of FIG. 2 and S301 of FIG. 3 in detail.

(S901) Hypervisor 214 of migration destination sets VfcWWN2 in area of memory for making communication of WWN between driver 221 of LP 212 and firmware of FC-HBA 217.

(S902) Hypervisor 214 of migration destination sets logging-in request to FC switch 132 in area of memory in which request from OS driver of LPAR 212 is set in firmware of FC-HBA 217.

(S903) Hypervisor 214 of migration destination writes value in decided area of MMIO (memory mapped input/output) of FC to thereby notify logging-in request to FC switch 132 to firmware of FC-HBA 217.

(S904) Firmware of FC-HBA 217 which has received request performs switch logging-in.

(S905) Firmware of FC-HBA 217 sets response in response area of memory after completion of switch logging-in and (S906) issues interrupt for informing that switch logging-in is completed.

(S907) Hypervisor 214 of migration destination which has known completion by interrupt investigates response from firmware of FC-HBA 217 to confirm that error and so on do not occur.

(S908) Thereafter, hypervisor 214 of migration destination waits for state that logging-in can be made to LU 134 connected to FC switch 132 and sets inquiry request to FC switch 132 in request area to firmware of FC-HBA 217.

(S909) Hypervisor 214 of migration destination rites inquiry request in decided area of MMIO area to thereby notify inquiry request to firmware of FC-HBA 217.

(S910) Firmware of FC-HBA 217 which has received request performs inquiry to switch 132 and (S911) sets response in the response area after completion of inquiry. (S912) Firmware of FC-HBA 217 issues interrupt for notifying that inquiry is completed.

(S913) Hypervisor 214 which has known completion by interrupt investigates response from firmware of FC-HBA 217 to confirm that error and so on do not occur.

(S914) Hypervisor 214 of migration destination sets target logging-in request for performing logging-in to LU 134 (target to be logged in) connected to FC switch 132 in request area to firmware of FC-HBA 217 and (S915) writes target logging-in request in decided area of MMIO after setting of target logging-in request to thereby notify target logging-in request to FC-HBA 217.

(S916) Firmware of FC-HBA 217 which has received request makes target logging-in processing and, after completion of target logging-in, (S917) sets response in response area. Then, (S918) firmware of FC-HBA 217 generates interrupt for notifying that target logging-in is completed.

(S919) Hypervisor 214 which has known completion by interrupt investigates response from firmware of FC-HBA 217 to confirm that error and so on do not occur.

Referring to FIG. 10, contents written in request area to firmware are described. In the request area, switch logging-in request, switch inquiry request and target logging-in request are judged by command and subcommand. Information necessary for requests is set in request area and other areas.

Referring to FIG. 11, contents written in response area to firmware are described. Error information, error number, number of retry requests, commands and subcommands are set in response area and information inherent in commands and subcommands is set in other areas.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A virtual computer system including a memory device having a logical unit, a plurality of physical computers and a plurality of logical partitions (LPARs) which are operated in the physical computers by control of hypervisors, comprising:

a first physical computer including a first LPAR and a first shadow LPAR which are operated by control of a first hypervisor; and a second physical computer including a second LPAR and a second shadow LPAR which are operated by control of a second hypervisor;

wherein:

when the first LPAR having a first path controller is migrated to the second physical computer to be operated as the second LPAR having a second path controller in the second physical computer, the first shadow LPAR is configured to transfer a first world wide name (WWN) assigned to a first logical host bus adapter (HBA) provided in the first LPAR as an identifier and a second WWN assigned to a second logical HBA provided in the first LPAR as an identifier to the second shadow LPAR, and the second hypervisor is configured to change a third WWN assigned to a third logical HBA provided in the second LPAR as an identifier and a fourth WWN assigned to a fourth logical HBA provided in the second LPAR as an identifier into the first and second WWNs transferred, respectively, the first hypervisor logging out connection between the second logical HBA and the logical unit to make connection state between the second logical HBA and the logical unit off-line, the second hypervisor is configured to log in connection between the fourth logical HBA having the second WWN and the logical unit, the first shadow LPAR is configured to transfer logical resource information of the first LPAR to the second shadow LPAR, the second hypervisor is configured to make the transferred logical resource information of the first LPAR reflected on the second LPAR, the first hypervisor is configured to receive completion notification of connection between the fourth logical HBA having the second WWN and the logical unit to make connection state between the second logical HBA to which the second WWN is transferred and the logical unit on-line, the first path controller is configured to recognize connection state between the second logical HBA and the logical unit to be on-line, the first shadow LPAR is configured to transfer differential information of logical resource information of the first LPAR to the second shadow LPAR, the second hypervisor is configured to make the transferred differential information of logical resource information of the first LPAR reflected on the second LPAR, the first hypervisor is configured to make connection state between the first logical HBA and the logical unit off-line, the second hypervisor is configured to start operation of the migrated second LPAR when completion notification of the reflection is received, the first path controller is configured to stop operation by start of operation of the second LPAR, the second path controller is configured to recognize connection state between the fourth logical HBA having the second WWN and the logical unit to be on-line, the first hypervisor is configured to log out connection between the first logical HBA and the logical unit.

2. A virtual computer system according to claim 1, wherein after the first hypervisor logs out connection between the first logical HBA and the logical unit, the second hypervisor is configured to log in connection between the third logical HBA and the logical unit, and the second path controller is configured to recognize connection state between the third logical HBA and the logical unit to be on-line.

3. A virtual computer system according to claim 1, wherein configuration information of the first LPAR in state that OS is operated is transferred to the second physical computer, so that the first LPAR is migrated to the second physical computer to be operated as second LPAR in the second physical computer.

4. A virtual computer system according to claim 1, wherein the first path controller is configured to select any one of path of the first logical HBA connected to the logical unit and path of the second logical HBA connected to the logical unit, and the second path controller is configured to select any one of path of the third logical HBA connected to the logical unit and path of the fourth logical HBA connected to the logical unit, the first path controller being migrated to the second LPAR by transfer of logical resources to be operated as second path controller after logical CPU of LPAR of migration destination is configured to be started.

5. A virtual computer system according to claim 1, wherein the first shadow LPAR is configured to transmit inherent information of the first LPAR upon migration of the first LPAR and the second shadow LPAR is configured to receive inherent information of the first LPAR upon migration of the first LPAR.

6. A virtual computer system according to claim 1, wherein the first and second LPARs include HBA driver which logs in connection between the HBA and the logical unit.

7. A virtual computer system according to claim 1, comprising means to make logging-in request to firmware of fibre channel-host bus adapter (FC-HBA) of the second physical computer comprises utilizing interface between the firmware and driver, setting WWN in communication area in memory of the firmware and driver, performing writing in memory mapped input/output (MMIO) area for opportunity of logging-in to the firmware, and performing logging-in processing to fibre channel switch (FC-switch) connected to the FC-HBA through communication area with the firmware and logging-in processing to disk connected FC-switch.

8. A virtual computer system according to claim 1, wherein the first hypervisor is configured to transfer logical resource information of the first LPAR and differential information thereof to the second hypervisor, and the second hypervisor is configured to make the transferred logical resource information of the first LPAR and differential information thereof reflected on the second LPAR.

9. A virtual computer system according to claim 3, wherein when connection between the fourth logical HBA having the second WWN and the logical unit is logged in and connection state between the second logical HBA to which the second WWN is transferred and the logical unit is off-line, the OS being operated making writing in the logical unit, the first hypervisor is configured to trap start request command from driver of the first LPAR to firmware of fibre channel-host bus adapter (FC-HBA) provided in the first physical computer, and the first shadow LPAR is configured to transfer information set by the driver to the second shadow LPAR, the second hypervisor is configured to transmit start request command to firmware of FC-HBA provided in the second physical computer on basis of the transferred information, the firmware of FC-HBA provided in the second physical computer is configured to make writing in the logical unit on basis of the transferred information to transfer the written information to the second hypervisor, the second shadow LPAR is configured to transfer the transferred written information to the first shadow LPAR, the first hypervisor is configured to set response from firmware of FC-HBA to the writing in designated memory on basis of the transferred written information to transmit the setting to driver of the first LPAR.

10. A virtual computer system according to claim 3, wherein when connection between the fourth logical HBA having the second WWN and the logical unit is logged in and connection state between the second logical HBA to which the second WWN is transferred and the logical unit is off-line, the OS being operated making reading from the logical unit, the first hypervisor is configured to trap start request command from driver of the first LPAR to firmware of fibre channel-host bus adapter (FC-HBA) provided in the first physical computer, and the first shadow LPAR is configured to transfer information set by the driver to the second hypervisor, the second hypervisor is configured to transmit start request command to firmware of FC-HBA provided in the second physical computer on basis of the transferred information, the firmware of FC-HBA provided in the second physical computer is configured to make reading from the logical unit on basis of the transferred information, the second shadow LPAR is configured to transfer information after reading containing the read information to the first shadow LPAR, the first hypervisor is configured to set the read information and response from firmware of FC-HBA to reading in designated memory on basis of the transferred read information to transmit the setting to driver of the first LPAR.

11. A migration method of virtual computer in a virtual computer system including a memory device having a logical unit, a plurality of physical computers and a plurality of logical partitions (LPARs) which are operated in the physical computers by control of hypervisors, wherein the virtual computer system comprises:

a first physical computer including a first LPAR and a first shadow LPAR which are operated by control of a first hypervisor; and a second physical computer including a second LPAR and a second shadow LPAR which are operated by control of a second hypervisor;

and the method comprising:

when the first LPAR having a first path controller is migrated to the second physical computer to be operated as second LPAR having a second path controller in the second physical computer, the first shadow LPAR transfers a first world wide name (WWN) assigned to a first logical host bus adapter (HBA) provided in the first LPAR as an identifier and a second WWN assigned to a second logical HBA provided in the first LPAR as an identifier to the second shadow LPAR, and the second hypervisor changes a third WWN assigned to a third logical HBA provided in the second LPAR as an identifier and a fourth WWN assigned to a fourth logical HBA provided in the second LPAR as an identifier into the first and second WWNs transferred, respectively, the first hypervisor logging out connection between the second logical HBA and the logical unit to make connection state between the second logical HBA and the logical unit off-line, the second hypervisor logging in connection between the fourth logical HBA having the second WWN and the logical unit, the first shadow LPAR transferring logical resource information of the first LPAR to the second shadow LPAR, the second hypervisor making the transferred logical resource information of the first LPAR reflected on the second LPAR, the first hypervisor receiving completion notification of connection between the fourth logical HBA having the second WWN and the logical unit to make connection state between the second logical HBA to which the second WWN is transferred and the logical unit on-line, the first path controller recognizing connection state between the second logical HBA and the logical unit to be on-line, the first shadow LPAR transferring differential information of logical resource information of the first LPAR to the second shadow LPAR, the second hypervisor making the transferred differential information of logical resource information of the first LPAR reflected on the second LPAR, the first hypervisor making connection state between the first logical HBA and the logical unit off-line, the second hypervisor starting operation of the migrated second LPAR when completion notification of the reflection is received, the first path controller stopping operation by start of operation of the second LPAR, the second path controller recognizing connection state between the fourth logical HBA having the second WWN and the logical unit to be on-line, the first hypervisor logging out connection between the first logical HBA and the logical unit.

* * * * *